Henry W Adams & Steuben T Bacon's Improved Steam Vacuum Drying Apparatus

Patented Jul 4 1871

No. 116532

Witnesses
Frank Stout
Joseph Evans

Inventors
Henry W Adams
Steuben T Bacon

Henry W. Adams & Steuben T. Bacon's
Improved Steam Vacuum Drying Apparatus
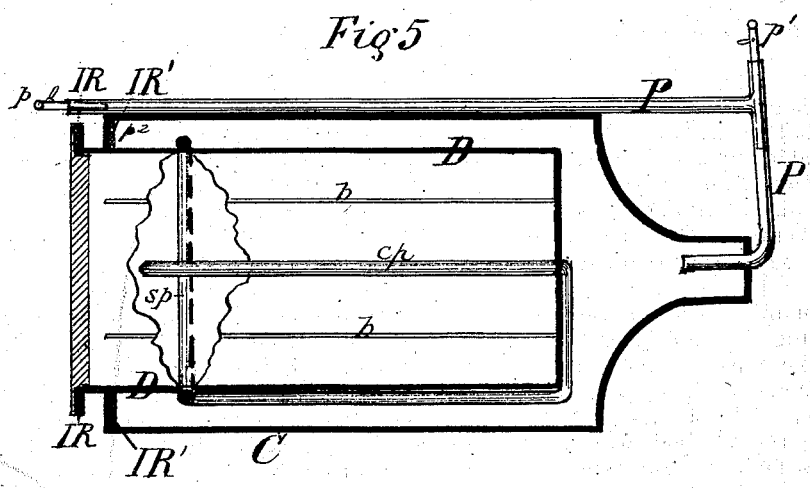
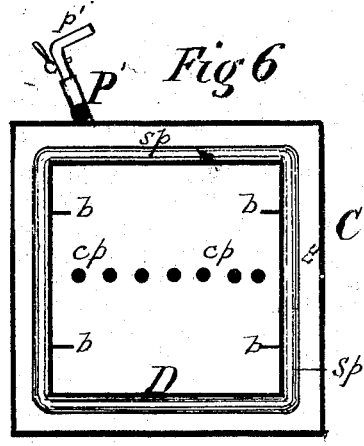
Witnesses
Frank Stout
Joseph Evans
Inventors
Henry W. Adams
Steuben T. Bacon 116,532

UNITED STATES PATENT OFFICE.

HENRY W. ADAMS, OF PHILADELPHIA, PENNSYLVANIA, AND STEUBEN T. BACON, OF BOSTON, MASSACHUSETTS; SAID ADAMS ASSIGNS HIS RIGHT TO SAID BACON.

IMPROVEMENT IN DRIERS.

Specification forming part of Letters Patent No. 116,532, dated July 4, 1871.

*To all whom it may concern:*

Be it known that we, HENRY W. ADAMS, M. D., of the city and county of Philadelphia and State of Pennsylvania, and STEUBEN T. BACON, of Boston, county of Suffolk and State of Massachusetts, have invented a Steam-Vacuum Drying Apparatus, of which the following is a specification:

The first part of our invention relates to the method of producing a vacuum in a kiln for drying substances; the object of this part of our invention being to facilitate the freeing of said substances from water. The second part of our invention relates to the method of warming the said substances to facilitate the removal of the water from the same.

Figure 1:
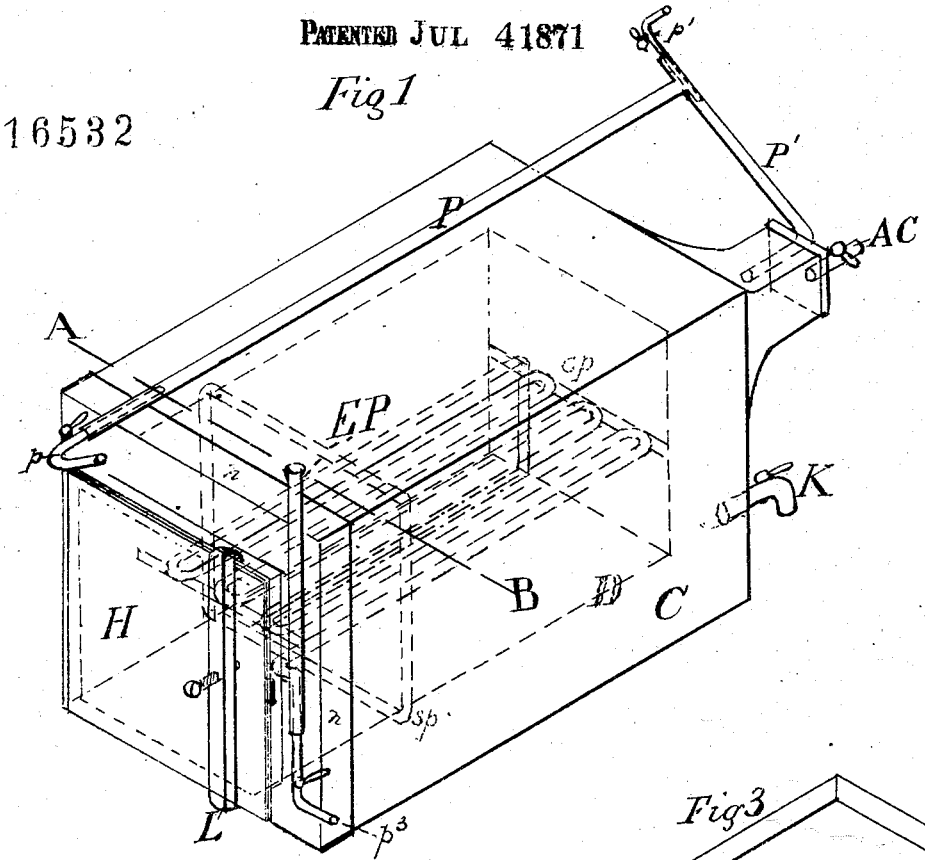
Figure 2:
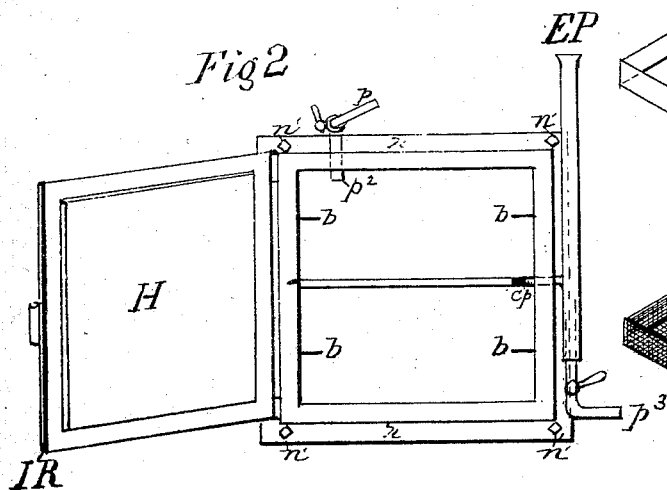
Figure 3:
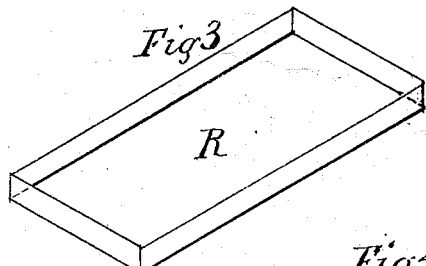
Figure 4:
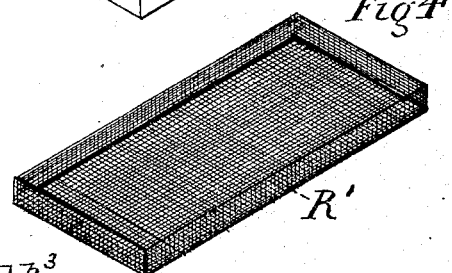

Figure 1 represents an isometrical view of our apparatus; Fig. 2, a front view of the same. Figs. 3 and 4 are views of the drying-pans. Fig. 5 is a longitudinal sectional view through the center. Fig. 6 is a sectional view on the line A B in Fig. 1.

D, in Fig. 5, represents a longitudinal sectional view of the vacuum-chamber in which the substances to be dried are placed. D, in Fig. 1, also represents the same chamber. This chamber is made of metal, and air-tight. H, in Figs. 1 and 2, represents the method, shown in the drawing, of opening and closing the chamber and sealing it air-tight. I R, in Fig. 2, represent India-rubber packing around the inner edge or border of the door, which, when closed, fits against the end of the chamber, as shown in Fig. 1. The cross-bar L is then placed across it, and its set-screw turned until the joint is made air-tight. The mode of making the vacuum is as follows: P and P' represent a steam-pipe. $p$ and $p'$ represent steam-pipes to be connected with a steam-generator for injecting steam into P and P'. $p^2$, in Fig. 5, represents a pipe connecting the vacuum-chamber with the steam-pipe P. When steam is turned into the pipe $p$, and escapes from its inserted end through a small opening into the larger pipe P, it draws the air or vapor out of the chamber D, and forces it through pipe P and P' into the space E, between the chamber D and its case C, and thus makes a vacuum more or less perfect in the chamber D. The jet of steam to be introduced into the pipe $p^1$ shooting down into the larger pipe P', is designed to act as the co-efficient of $p$ in producing said vacuum. C represents a case surrounding the chamber D, having a small space between them. A flange, $n\ n$, is firmly secured to the chamber D, a small distance back from its front. A corresponding flange is fitted to the end of the case C. These two flanges, with an India-rubber packing between them, are fastened together by the bolts and nuts $n'\ n'\ n'\ n'$. $s\ p$ represent a pipe surrounding the vacuum-chamber near its front end, perforated with fine holes. Connected with this pipe is one end of the coil $c\ p$, located in the vacuum-chamber for a heater, and the other end of the said coil is connected with the exhaust-pipe E P, Fig. 2. A jet of steam to be introduced from the generator into the pipe $p^3$, and escaping from it through a small opening into the larger exhaust-pipe E P at a point above the connection of the said coil with the said pipe, will draw all air, vapor, or gaseous matter in the space E between the chamber and its case into the pipe $s\ p$, through the small and equidistant perforations in it, and from thence into and through the coil $c\ p$, and discharge them through the pipe E P into the air. This device will heat equally all sides of the vacuum-chamber, and also its interior, to any degree of temperature desirable for the purposes of this invention. The principal object of this invention being to desiccate substances, such as meat, milk, fruits, grains, and vegetables which should be dried at a temperature below that of steam, it is desirable to introduce into the space E, between the vacuum-chamber and its case, air to condense the steam discharged into it from the steam-pipes P P', by which means the air is raised to a temperature below steam-heat, and is drawn through the coil $c\ p$ and discharged from E P, while the condensed steam is drawn off at the cock K. A, C, and F, Fig. 1, represent the devices for introducing said air, the quantity desired at any time to be admitted being regulated by the valve at A C. The steam-jet at $p^3$ will produce such a draught from the space E between the vacuum-chamber and its case, that when the cock at A C is opened air will rush into the said space with great force through the pipe F, be drawn into the pipe $s\ p$, and through the coil $c\ p$, and discharged from the pipe E P. In this manner a desirable heat may be communicated to the substances to be dried. Another mode of supplying heat to the vacuum-chamber is to admit hot air through the pipe F and valve at A C, heated by any known process. The great benefit of this vacuum consists in reducing the vaporizing temperature in the chamber below that at which water vaporizes in the open air, and instantly removing the said vapor, by which means the process of desiccation is expedited and the substances less injured by heat. R in Fig. 3 represents a vessel for holding milk, sirup, or other liquids to be concentrated. $R^1$, Fig. 4, represents a perforated vessel for holding solid substances, to permit a freer escape of the vapor. $b\,b\,b\,b$ in Fig. 6 show supports for vessels or trays.

What we claim as our invention, and desire to secure by Letters Patent, is—

1. The steam-pipe P, in combination with the vacuum-chamber D, and the space between said chamber and its outer case, C, substantially in the manner and for the purposes shown and described.

2. The pipe $p^1$, in combination with the pipe P, and the space between C and D, substantially in manner and for the purposes shown and described.

3. The valve A C, in combination with the case C communicating with the space included between C and D, substantially in the manner and for the purposes shown and described.

4. The perforated pipe $s\,p$ in the space between the case C and chamber D, in combination with the coil $c\,p$ in the chamber D.

5. The coil $c\,p$ communicating with the spaces between C and D, substantially in the manner and for the purposes shown and described.

6. The pipe $p^3$, in combination with E P and coil $c\,p$, substantially in the manner and for the purposes shown and described.

7. The use of air entering through the valve A C into the space E, between C and D, in the manner and for the purposes shown and described.

8. In an apparatus substantially as hereinbefore described, the hot-air pipe F, provided with valve A C, all as herein set forth.

9. In the drying apparatus hereinbefore described, the flange $n\,n$, in combination with chamber D, and the corresponding flange on case C united together with packing by means of bolts and nuts $n'\,n'\,n'\,n'$, substantially in the manner and for the purposes shown and described.

HENRY W. ADAMS, M. D.
STEUBEN T. BACON.

Witnesses:
CHARLES H. EVANS,
JOSEPH EVANS.